United States Patent
Cassoli et al.

(10) Patent No.: US 6,923,311 B2
(45) Date of Patent: Aug. 2, 2005

(54) DEVICE TO MODIFY THE PITCH BETWEEN PUSHERS ACCORDING TO THE LENGTH OF THE PRODUCT

(75) Inventors: Stefano Cassoli, Casalecchio di Reno (IT); Luca Baldanza, Casalecchio di Reno (IT); Andrea Cinotti, Bologna (IT)

(73) Assignee: KPL Packaging S.p.A. (IT)

( * ) Notice: Subject to any disclaimer, the term of this patent is extended or adjusted under 35 U.S.C. 154(b) by 0 days.

(21) Appl. No.: 10/472,936
(22) PCT Filed: Jan. 23, 2003
(86) PCT No.: PCT/EP03/00667
   § 371 (c)(1),
   (2), (4) Date: Sep. 26, 2003
(87) PCT Pub. No.: WO03/064302
   PCT Pub. Date: Aug. 7, 2003

(65) Prior Publication Data
   US 2004/0104099 A1 Jun. 3, 2004

(30) Foreign Application Priority Data
   Jan. 31, 2002 (IT) .................................. BO02A0049

(51) Int. Cl.[7] ...................... B65G 29/00; B65G 37/00; B65G 47/04; B65G 47/34; B65G 47/84
(52) U.S. Cl. .............................. 198/479.1; 198/468.1; 198/728
(58) Field of Search .......................... 198/468.1, 469.1, 198/479.1, 728, 734, 740

(56) References Cited

U.S. PATENT DOCUMENTS

| | | | |
|---|---|---|---|
| 2,153,773 A | * | 4/1939 | Patrignani .................. 417/415 |
| 5,213,198 A | | 5/1993 | Kovacs |
| 5,529,167 A | * | 6/1996 | Gabriele .................. 198/479.1 |
| 6,588,043 B1 | * | 7/2003 | Frost et al. .................. 198/734 |
| 6,652,218 B1 | * | 11/2003 | Eggebrecht et al. ........ 198/740 |
| 2003/0159903 A1 | | 8/2003 | Hahnel et al. |

* cited by examiner

Primary Examiner—Gene O. Crawford
(74) Attorney, Agent, or Firm—Stites & Harbison PLLC; Marvin Petry

(57) ABSTRACT

The apparatus is formed of two identical devices (A, A') installed mirror image-fashion, each of which is equipped with a pressure bar (19, 19') fitted to overhang the relevant lateral toothed conveyor belts (T, T') which move and recircle the sai bars, and which are in their turn activated by relevant motors (8, 8') with electronic speed and phase control governed by one programmable processing unit (26). When the length of the products (P) is less than the length of the straight branches of the conveyors moving the said bars, the two devices are installed mirror-image fashion, with the axles of the pulleys of one conveyor aligned with those of the corresponding pulleys of the other conveyor. In this position, the bars (19, 19') of the two devices alternate in taking, moving foward by pushing and the final placing of the product in the workstation (K). However, when the length of the products exceeds the length of the said conveyors moving the bars, the possibility is offered of acting on both means, allowing anticipation of the longitudinal position of one device in relation to the other, so that the products are firstly taken by the bar (19') of device (A') working in advance and are transferred from it in phase to the bar (19) of the downstream device (A), which in turn provides for the transfer and phased placing of the product in the workstation (K).

13 Claims, 3 Drawing Sheets

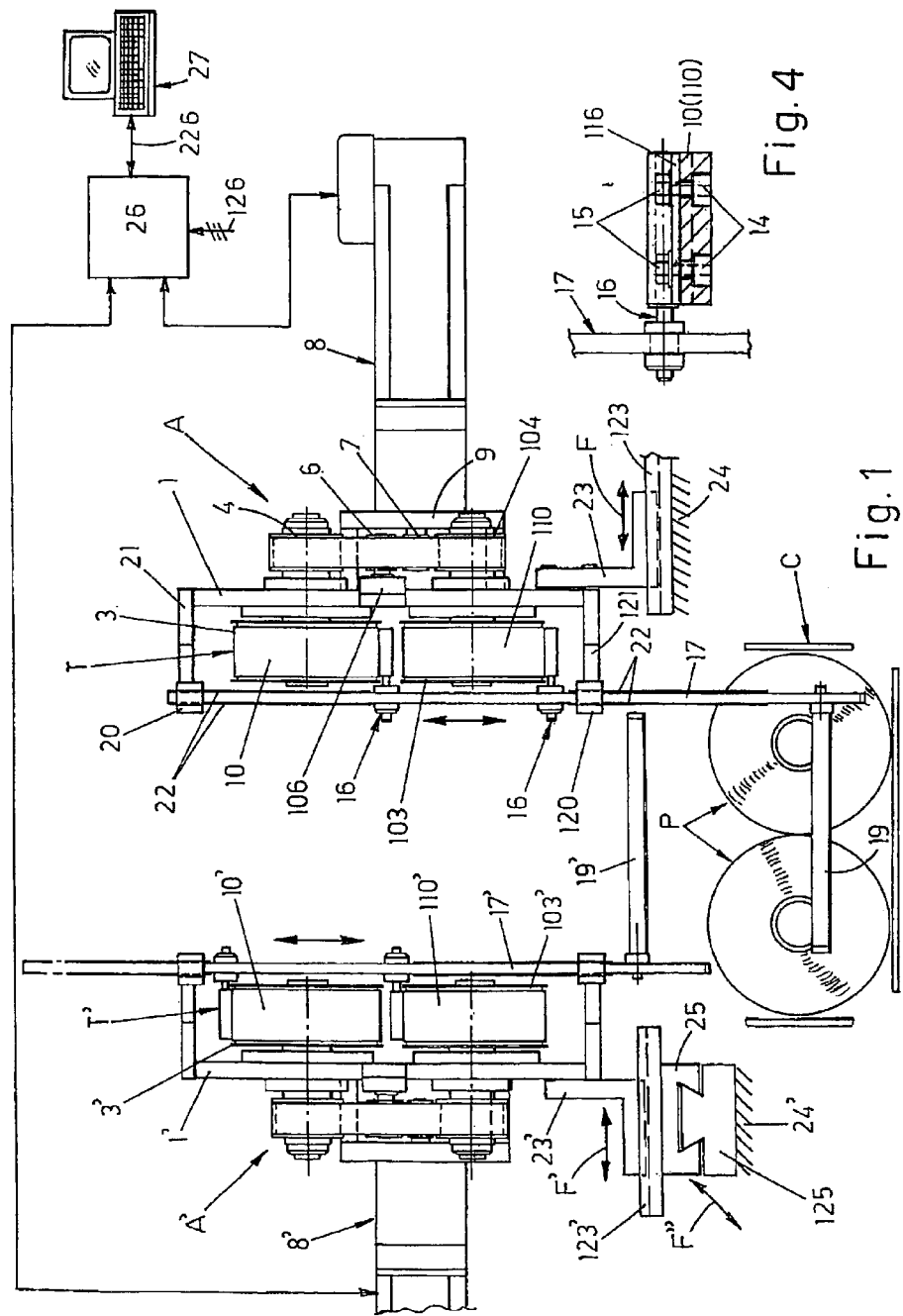

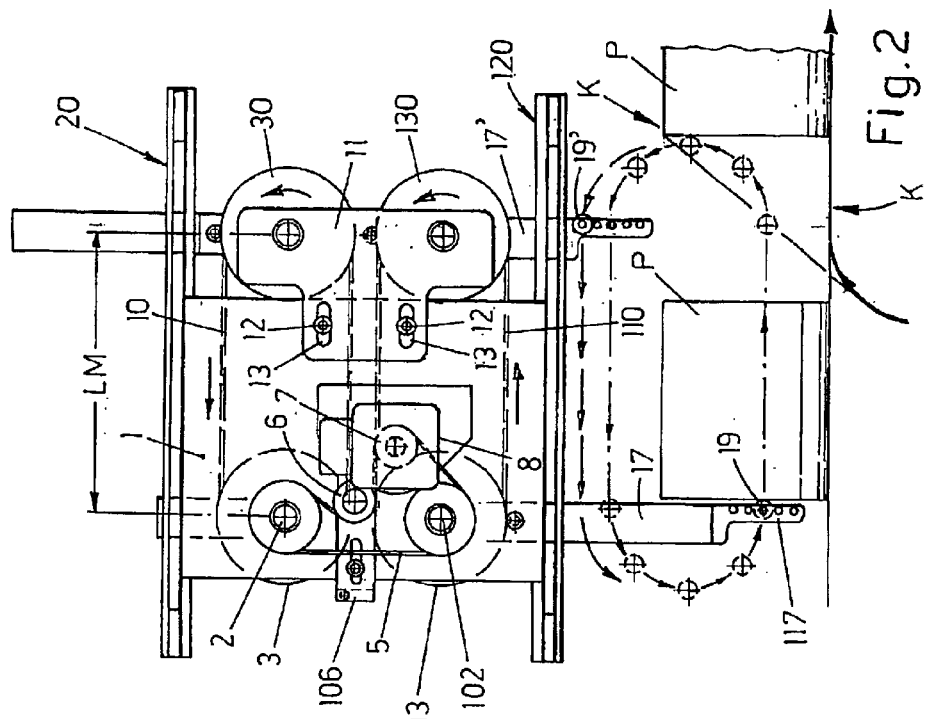
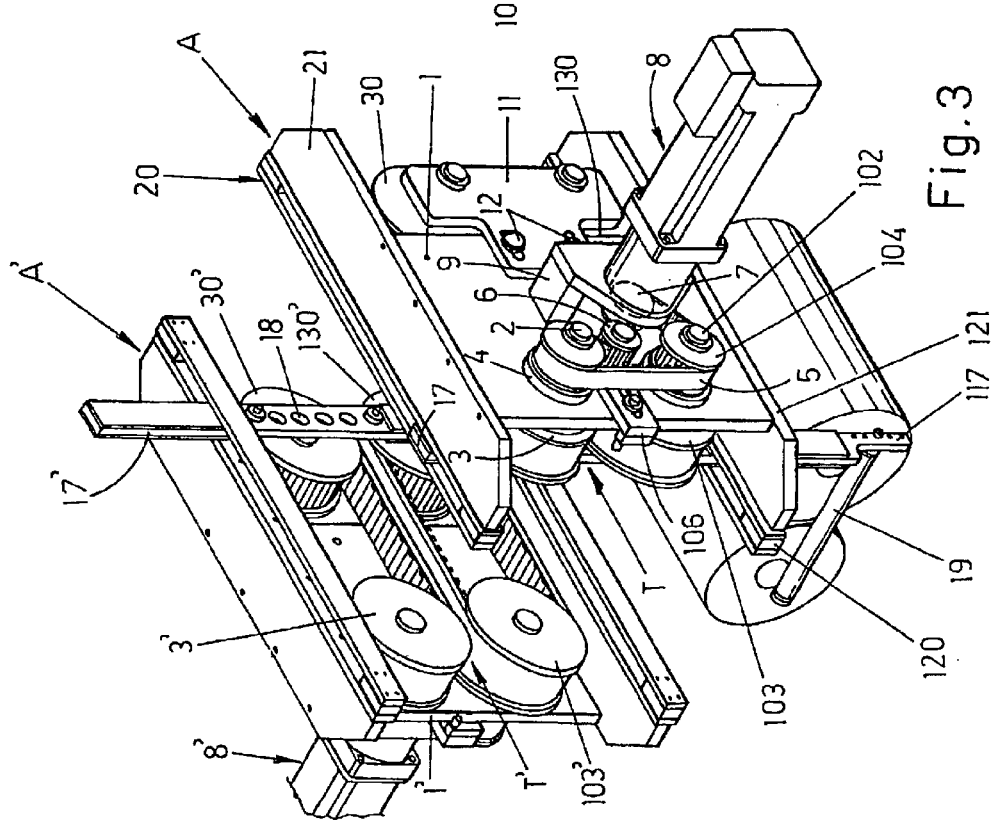

DEVICE TO MODIFY THE PITCH BETWEEN PUSHERS ACCORDING TO THE LENGTH OF THE PRODUCT

The invention concerns a variable pitch apparatus for thrust and phase feed of products to a workstation. In particular, but not exclusively, the invention finds industrial use in a machine of so-called flow-pack type for packing paper rolls or paper and board products in heat-weldable film packaging. The apparatus operates subsequently on paper rolls which are fed in phase by means of a well-known type and pushes these same products in phase into axial tubing mandrel of the thermoplastic film material unwound by a bobbin and which in passing over the said former mandrel is formed into a tube for wrapping the products and is then welded longitudinally to finish off the tubular packaging which is subject downstream of the mandrel to the action of transverse means of cutting and/or tearing for the reciprocal separation of the packagings which is then closed at the ends by other means.

To carry out functions of this type so-called recirculation transfer devices are known, whose thrust units are connected to pairs of adjoining chain conveyors usually connected to a single motive power source, one directly and the other with the intervention of a phase shifter, by acting on which it is possible to vary the distance between the device's thrust units to adapt their pitch at a different pitch and the varying length of products to be packaged. These devices are structurally complex, bulky and have little flexibility for adaptation to varying demands of use. Similar recirculation transfer devices are described in U.S. Pat. No. 5,213,198, for example.

The invention is meant to obviate known technical limits with a variable pitch thrust feed apparatus formed of two adjoining identical devices installed mirror-image fashion, each of which is equipped with a thrust bar fixed to overhang a relevant positive type lateral conveyor, e.g. with toothed belts, which moves the recirculating bar and which is in turn moved by a relevant electronically controlled speed and phase motor. The motors of the two conveyors are connected to a processing unit which may be easily programmed to adapt the working of the apparatus to varying work requirements. When the length of the products is less than the length of the straight and working branches of the conveyors moving the said bars, the two devices are placed side by side mirror-image fashion with the pulleys of one lateral conveyor aligned with those of the corresponding pulleys of the other conveyor. In this condition the bars of the two devices alternate in taking, moving forward by thrusts and finally placing the products in the packaging station. However, when the length of the products exceeds the length of the said active branches of the conveyors moving the bars, the possibility is given of acting on the means allowing anticipation of the longitudinal position of one device in respect of the other, so that the products are first taken by the bar of the device working in advance and are transferred thereby in phase to the bar of the device downstream, which in turn provides for the transfer and phased placing of the product in the packaging station.

Major characteristics of the invention and the benefits derived therefrom will appear more obvious from the following description of a preferred form for its implementation, illustrated by way of non-restrictive example in the figures of the three appended sheets of drawings in which:

FIGS. 1, 2 and 3 illustrate the apparatus respectively in front elevation, side elevation and in perspective, as well as in the phase feed condition for products of a length less than that of the active branches of the conveyors of the two recirculation devices comprising this apparatus;

FIG. 4 illustrates with parts in section, the constraint on one of the toothed conveyor belts of the apparatus from one of the vertical connecting rods with the relevant thrust bar;

Figure 6:
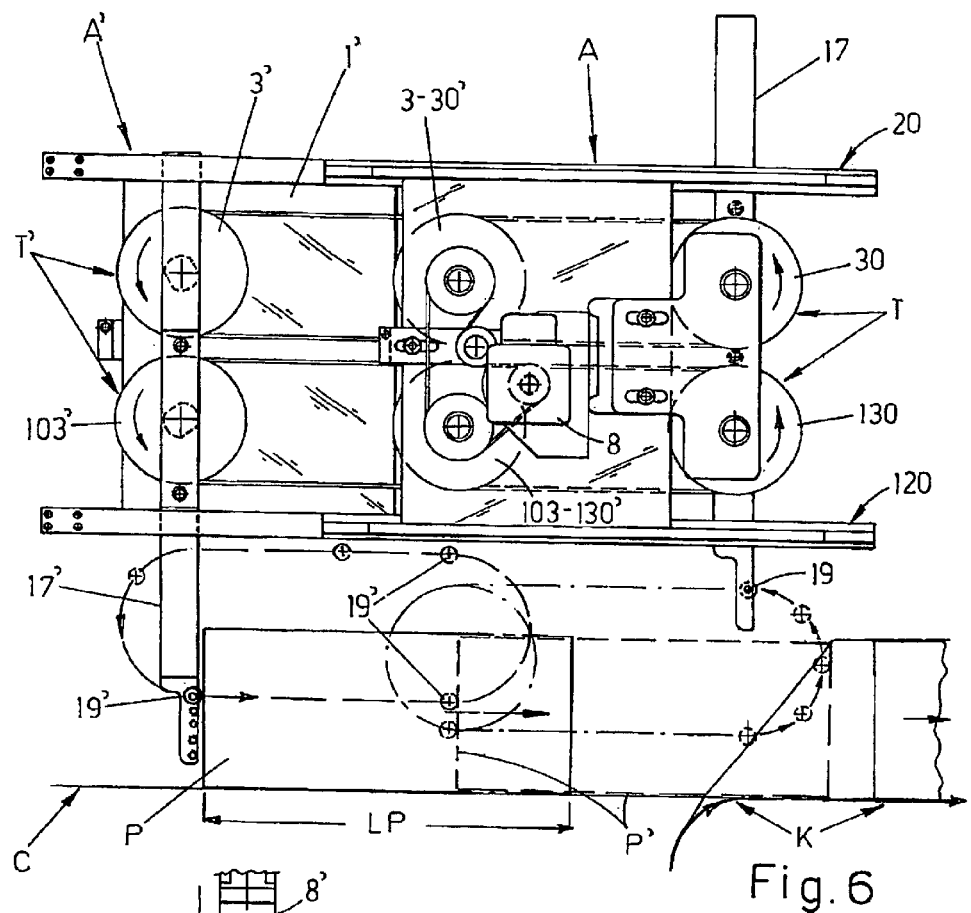
FIGS. 5 and 6 illustrate the equipment in the plant respectively from above and in side elevation, as well as in the phase feed condition for products of a length greater than that of the active branches of the conveyors of the two recirculation devices of the said apparatus.

The apparatus comprises two identical devices placed opposite one another mirror-image fashion indicated by A and A'. To simplify the description reference shall now be made to device A, which is composed of a vertical plate 1, which supports revolving at right angles a pair of horizontal axles, 2, 102 lying on an ideal vertical plane and protruding from the opposing sides of the said plate to carry keyed onto the side turned towards the other device A', toothed pulleys of equal diameter 3, 103 and to carry keyed on the other side of the said plate 1, toothed pulleys 4, 104 of equal diameter and smaller, for example than the previous pulleys and on which is fed a toothed belt 5 controlled by a tensioner 6 supported by an adjustable bracket 106 and fed on the toothed pulley 7 keyed to the shaft of a motive power set 8, which is in turn flanged on a bracket 9 with an L-shaped plate fixed to the plate 1. The motive power set 8 is equipped with an electric motor with electronic speed and phase control, e.g. of brushless type. Because of the kinematic connected to the set 8 described, the axles 2, 102 rotate in the same direction and at the same speed. On pulleys 3, 103 the toothed belts 10, 110 with identical characteristics are fed, fed on corresponding pulleys 30, 130 identical to those 3, 103 which are supported and rotate on a bracket 11, e.g. of T-shape, fixed to the plate 1 with screws 12 and with slot holes 13 allowing the horizontal adjustment of the said bracket to provide the said belts with the necessary longitudinal tension. The toothed belts 10, 110 produce the recirculation conveyor T of device A, are suitably spaced from one another and their straight branches are parallel to the product's direction of travel (see below).

At a point of the branch higher (or lower) than the belt 10 and at a corresponding point of the branch higher (or lower) than the belt 110 (points aligned vertically with each other) are fixed by a known solution transverse pins 16 which expediently protrude from the side of the belt opposite that turned towards the plate 1. From the detail of FIG. 4 it is noted for example that the pins 16 are equipped on their sides with drilled appendages 116 which are fixed to the belt 10 or 110, e.g. by means of screws 15 screwed into small guides 14 housed in holes formed and obtained into one tooth of this belt. The pins 16 may themselves be revolving in the part which links them to the belt or may be fixed and in this instance are fitted with a coupling revolving at intermediate points of a flat and vertical connecting rod 17, produced preferably in light alloy and provided with lightening holes 18 so as to have a limited weight. The lower end of the connecting rod 17 is conveniently tapered as shown by 117 in FIG. 2 and above this is fixed perpendicularly and overhanging a horizontal bar 19 preferably comprised of a idle roller, which conveniently protrudes at the front from the said end 117 which is turned towards the travelling direction of the product. By virtue of the connection to the synchronised conveyor belts 10, 110, the bar 19 is activated by a recircling movement with a straight displacement of travel in the low position and return in the raised position. To avoid the transom 19 making undesirable oscillating movements, provision has been made for the sections of the connecting rod 17 protruding above and below the pairs of transport belts 10, 110 run in straight, parallel guides 20, 120 integral to brackets 21, 121 fixed to the lower and upper ends of the plate 1 and provision is made for the co-operation between these connecting rods 17 and the aforementioned guides takes place with the intervention of material with a low friction coefficient, e.g. with coatings of suitable plastic material 22 fixed to the opposing faces of the parts of the connecting rod 17 working together with the said guides.

The components of device A', which are identical to those described for device A, are shown with identical numbers and with the addition of the "prime" symbol ('). From FIG. 1 it is apparent that devices A and A', as described, are arranged so that their thrust bars 19, 19' operate transversely and within a guide channel C defined lower down by a fixed surface or by a carrier which moves at a speed lower than that of the belts 10, 110 and defined lower down by guide rails whose relative position may be changed to vary the dimensions of the product P to be handled. For the adaptation for carrying products of different dimensions, it is for example foreseen that these devices A and A' are fixed with their plates 1, 1' on relevant horizontal runners 23, 23' running on corresponding straight guides 123, 123' parallel to the bars 19, 19' of the same devices under discussion and of these guides one is fixed to a support frame shown schematically with 24, whilst the other is fitted, for example, on an orthogonal and horizontal runner 25, therefore parallel to the channel C, which in turn runs on a corresponding guide 125 fixed to a support frame 24'. It is understood that the linking order of the guides 123' and 125 to the frame 24' may be inverted compared with the solution shown. Appropriate means of manual and remotely controlled operation are foreseen for working the runners 23, 23' to change the distance between the devices A and A' upon variation of the width of the product to be conveyed, as shown by the arrows F and F', and to work the runner 25 as shown by the arrow F'" to change the relative horizontal position of these devices A and A' upon variation of the length of the product P (see below).

The motors 8 and 8' of the devices A and A' are connected to a processing unit 26 equipped with at least one input 126 to receive synchronism and phase information and other data from components of the plant in which the apparatus concerned in used and which is connected in 226 to a programming and interrogation unit 27. The recording equipment allowing the operational adaptation of the apparatus to varying sizes of products and the conveyors T, T' might usefully be equipped with encoders to transfer to the unit 26 appropriate position and phase data for facilitating the predisposition of this apparatus for correct automatic operation.

If the length of the product P is less than the existing distance between axles LM (FIG. 2) of the toothed pulleys operating the belts 10, 110 of the devices A and A' involved, these devices are placed opposite one another mirror-image fashion as in FIGS. 2 and 3, so that the axles of the pulleys of the conveyors T of one device are aligned with those of the pulleys of the conveyor T' of the other device. The apparatus works in the following way. While the bar 19 of device A is placed behind a product P fed in phase by appropriate means to the apparatus, the bar 19' of device A' has given up or is about to give up the product P' which it has previously placed in workstation K, e.g. in a packaging station and this bar 19' is raised and starts the return course with a speed that is also different from or even higher that of the forward travel movement, and when the same bar 19' has reached the end of the return course, it may possibly slow down or stop awaiting a subsequent product to pick up and feed to the said station K. Since the bar completes the return movement cyclically, it must not interfere with the product P moving forward in the channel C due to the thrust effect exerted by the other bar, suitable means (not illustrated) could be provided to regulate the vertical position of the apparatus concerned in relation to the bottom of the transport channel C shown in FIG. 1 upon variation of the height of the products. The bar 19, which is low, pushes the relevant product P in the channel C and, at the end of this, places it in the station K which takes delivery of this product and makes it move forward at an identical linear speed. This transfer is completed after the bar 19 starts the rising movement with the return of the relevant connecting rod 17 around the axles of the pulleys 30, 130, so that due to the horizontal deceleration occurring in this return phase, the same bar is moved away from the transferred product and is therefore removed without interference with this product—interference which is at least mitigated in the initial part, from the possibility of that same bar 19 of revolving freely around itself since it is comprised of an idle roller.

Figure 5:
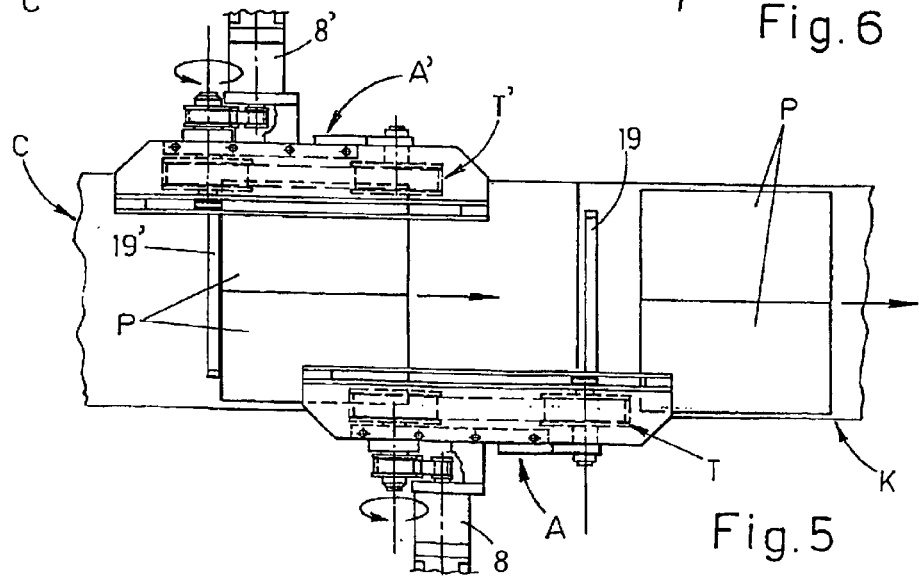

If the product length LP (FIG. 6) is greater than the distance between axles LM mentioned previously (FIG. 2), the runner 25 of the device A' (FIG. 1) is acted upon to move it forward appropriately in comparison with the other device A, up to the maximum and theoretical condition shown in FIGS. 5 and 6, where the pulleys 30', 130 of the device A' are aligned axially with those 3, 103 of the device A, so that the bar 19' of the device A' transfers the product in phase to the transom 19 of the device A, which in turn places the same product in the packaging station K in phase. If the length of the straight branches of the conveyors T, T' is of the order of, e.g., 280 mm, with the devices A and A' arranged as in FIGS. 5 and 6, it is possible to work on products with a length of up to some 500 mm.

From FIG. 1 it is apparent that the bar 19' of the device A' is fixed to the relevant lower end of the connecting rod 17' so as to be raised more than the bar 19 of device A, on account of which when the product reaches the position shown by P' and with the dashed sign in FIG. 6, the bar 19 of the device A is placed beneath that 19' of the device A'; the latter may thus freely rise during the return on the final pulleys 30', 130' of the conveyor T' without interfering with the bar 19 which remains in contact with the product to be placed in the said station K.

The protection of this patent application is also extended to the variant in which the apparatus is reversed compared with the solution shown, so that the thrust bars 19, 19' carry out the return movement below the products guide channel C.

What is claimed is:

1. A variable pitch apparatus for the thrust and phase feed of products to a subsequent workstation, said apparatus comprising:

a first thrust bar and a second thrust bar, each said thrust bar disposed transversely on a product feed channel, fixed to overhang a respective one of a pair of parallel conveyors, and connected to opposite sides of said channel, said conveyors each having a respective active branch for operating a respective one of said thrust bars which is less than the maximum length of the products which said apparatus feeds in phase to the workstation, wherein said thrust bars are each operable in a correct phase by driving means such that in traversing a respective outbound branch of said conveyors, each of said thrust bars are arranged alternately and, one at a time, behind the products being fed in the correct phase in said channel to provide forward movement of the product to place the product in the subsequent workstation, and after placing the product at the workstation, said first thrust bar traverses around at the final end of the respective conveyor, and is transferred to a return branch of said respective conveyor, said first thrust bar is removed from said feed channel and product flow and said first thrust bar traverses a direction opposite a direction of the product flow to arrange said first thrust bar for repetition of a new work cycle;

a first device and a second device associated with a respective one of said first thrust bar and said second thrust bar; and means for sliding said first device longitudinally relative to said second device when the length of the products exceeds that of one active branch of said conveyors so that the distance between a start of the active branch of a respective said conveyor of said first device in an advanced position and an end of an active branch of said other conveyor of said second device, which is in a downstream position relative to said first device, is from time to time greater and proportionate to the length of the products when said conveyors are moved by a respective driving means so that said first thrust bar of said first device picks up in phase the products which are fed in the correct phase forward and transfer in phase to said second thrust bar of said second device, when said second thrust bar of said second device further moves the products forward and places the products in phase in the workstation.

2. The apparatus of claim 1, wherein said first thrust bar of said first device is arranged so as to follow at a distance from the bottom of the product feed channel which is different from a distance existing between the bottom of the product feed channel and said second thrust bar of said second device, so that said first thrust bar gives up the product at the end of an active course of said first thrust bar without interfering with an already active second thrust bar of said second device.

3. The apparatus of claim 1, wherein said first device and said second device each comprise a vertical support plate placed on a respective side of the product feed channel and each said vertical support plate having a side turned towards the channel and disposed along the channel which provides support for a revolution toothed return pulley of a pair of toothed belts laid on top of said return pulley, appropriately spaced and also parallel relative to the product feed channel, one pair of said pulleys being mounted to revolve freely on a support attached to a respective said plate with tension adjustability of said toothed belts when axles of said other pair of pulleys traverse said plate, identical toothed pulleys disposed on an external side of said plate are keyed on a belt, said belt controlled by a tensioner and a toothed pulley keyed to a motive power set axle disposed on a bracket on the external side of said plate, and fixed supports with transverse pins disposed in vertical alignment with an upper branch and a lower branch of said belts, said fixed supports protruding from a side of said belts which is opposite that turned towards said plate, said fixed supports being rotatably fixed to a vertical connecting rod which, at its end, is attached to said second thrust bar which is fixed.

4. The apparatus of claim 3, wherein an end of a vertical connecting rod supporting said second thrust bar is tapered, and has holes formed therein, and said second thrust bar protrudes partly from a front of said vertical connecting rod.

5. The apparatus of claim 4, wherein said vertical connecting rod comprises a light alloy having a planar form.

6. The apparatus of claim 4, wherein said vertical connecting rod associated with said second thrust bar runs in horizontal and parallel guides linked to brackets fixed to overhang at a top and at a bottom of said support plate of both said first device and said second device.

7. The apparatus of claim 6, wherein surfaces of low friction coefficient material are provided between said vertical connecting rod and said respective guides to limit sliding friction between said vertical connecting rod and said respective guides.

8. A variable pitch apparatus for the thrust and phase feed of products to a subsequent workstation, said apparatus comprising:

two thrust bars disposed transversely in a product feed channel, each said thrust bar fixed to overhang a respective one of a pair of parallel conveyors and connected to opposite sides of said channel, said thrust bars operable in a correct phase by driving means such that in traversing an outbound branch of said conveyors, wherein said thrust bars are arranged alternately and, one at a time, behind the products being fed in the correct phase in said channel to provide forward movement of the product to place the product in the subsequent workstation, and after placing the product at the workstation, each bar traverses around at a final end of the respective conveyor, and is transferred to a return branch of said respective conveyor, said respective thrust bar is removed from said feed channel and product flow and said thrust bar traverses a direction opposite direction of the product flow to arrange said respective thrust bar for repetition of a new work cycle; and each said conveyor having one of a respective first support plate and second support plate which comprise a respective first device and second device, said first device and second device mounted on respective support frames with the support of horizontal guides and runners orthogonal to active branches of said conveyors and connected to respective manually or remotely controlled means of operation, all so as to be able to vary a transverse distance between said first device and said second device thereby accommodating variations in the width of the products to be handled.

9. The apparatus of claim 8, further comprising means for adjusting a vertical height of said apparatus to accommodate products of different heights.

10. The apparatus of claim 8, wherein said first plate of said first device is mounted on a support frame with the support of a guide and runner set parallel to the product feed channel and connected to respective manual or remotely controlled means of operation.

11. The apparatus of claim 10, wherein said first device and said second device each comprise respective adjustment equipment which provides for adaptation of said apparatus to accommodate products of different dimensions and each device is equipped with encoders connected to a processing unit governing respective motors of said first device and said second device which comprise said respective driving means.

12. A variable pitch apparatus for the thrust and phase feed of products to a subsequent workstation, said apparatus comprising:

two thrust bars disposed transversely in a product feed channel, said first thrust bar and said second thrust bar each comprising an idle roller and fixed to overhang a respective one of pair of parallel conveyors, said first thrust bar and said second thrust bar connected to opposite sides of said channel, respectively, said conveyors are movable by respective motors with electronic speed and phase control, connected to a processing unit equipped with at least one input to collect related phase signals from said first device an said second device and which is connected to a programming and interrogation unit, said thrust bars each operable in a correct phase by driving means such that in covering an outbound branch of said conveyors, wherein said thrust bars are arranged alternately and, one at a time, behind the products being fed in the correct phase in said channel to provide forward movement of the product to place the product in the subsequent workstation, and after placing the product at the workstation, each respective bar traverses around at a final end of the respective conveyor, and is transferred to a return branch of said respective conveyor, said respective thrust bar is removed from said feed channel and product flow and said thrust bar traverses a direction opposite direction of the product flow to arrange said respective thrust bar for repetition of a new work cycle, wherein, when the length of the products to be handled is less than a length of active branches of the first conveyor and second conveyor, respective return pulleys of said conveyors are aligned transversely to the flow of products and each conveyor is operable so that said respective thrust bar alternates in taking products, moving the product forward and placing the product in the workstation.

13. The apparatus of claim 12, wherein a linear forward speed of one of said thrust bars is equal to that of the workstation when the front face of a product fed by said one thrust bar at the workstation until a complete transfer of that product to the workstation.

* * * * *